United States Patent [19]
Hoeberigs

[11] Patent Number: 5,960,707
[45] Date of Patent: Oct. 5, 1999

[54] APPARATUS FOR HEATING ARTICLES OF FOOD BY WAY OF THE DRY METHOD

[76] Inventor: Jean Marie Mathieu Hoeberigs, Grote Maagdenstraat 45, NL 4524 ER Sluis, Netherlands

[21] Appl. No.: 09/049,061

[22] Filed: Mar. 27, 1998

Related U.S. Application Data

[63] Continuation of application No. PCT/EP96/04257, Sep. 24, 1996.

[30] Foreign Application Priority Data

Sep. 23, 1995 [BE] Belgium .................................. 9500800

[51] Int. Cl.⁶ ..................................................... A47J 37/12
[52] U.S. Cl. ............................ 99/443 R; 99/476; 99/478; 99/348; 366/239
[58] Field of Search ................................... 99/443 R, 478, 99/477, 476, 427, 348; 392/416; 219/400, 389; 366/239, 237

[56] References Cited

U.S. PATENT DOCUMENTS

| | | | |
|---|---|---|---|
| 4,173,925 | 11/1979 | Leon | 99/348 |
| 4,203,357 | 5/1980 | Vaussanvin | 99/443 R |
| 4,331,069 | 5/1982 | Tomatis | 99/348 X |
| 5,371,829 | 12/1994 | Hoeberigs | 99/479 |
| 5,613,774 | 3/1997 | Chandra et al. | 99/348 X |

FOREIGN PATENT DOCUMENTS

| | | |
|---|---|---|
| 504968 | 9/1992 | European Pat. Off. . |
| 61-268146 | 11/1986 | Japan . |

OTHER PUBLICATIONS

"Apparatus for producing popcorn" Patent Abstracts of Japan, vol. 11, No. 132 (C–417), Apr. 24, 1987 to Shigeru Nakamura.

*Primary Examiner*—Reginald L. Alexander
*Attorney, Agent, or Firm*—Shlesinger, Arkwright & Garvey LLP

[57] ABSTRACT

An apparatus (10) comprises a heating room (11) for the articles of food, heater (14) and a ventilator (16) for creating a hot air current, and further comprises a device (17, 19, 20, 22, 24, 26, 28) which can subject the heating room to a rocking movement around a horizontal axis (13). The heating room (11) is nearly closed and the heater (14) and ventilator (16) are inside the heating room (11) and are fixedly connected to the heating room (11) so that the relative distance between the heater and the articles of food does not change during the rocking movement.

20 Claims, 3 Drawing Sheets

APPARATUS FOR HEATING ARTICLES OF FOOD BY WAY OF THE DRY METHOD

CROSS-REFERENCE TO RELATED APPLICATIONS

This application is a continuation of co-pending application No. PCT/EP96/04257, filed Sep. 24, 1996, which claims priority of Belgian Application No. 9500800, filed Sep. 28, 1995.

FIELD OF THE INVENTION

The invention relates to an apparatus for heating of various kinds of articles of food by way of the so-called dry method. The term 'heating' means in what follows heating up, baking, frying, grilling, as well as unfreezing. The apparatus according to the invention may serve for the heating of different kinds of articles of food such as french fries, croquettes, bread, poultry, pizza. . .

STATE OF THE ART

The so-called dry method for the frying of articles of food stands in contradiction with the wet method. In the dry method the articles of food are not immersed in a bath of oil or fat, but have been baked beforehand or have been provided with the required quantity of fat. During the heating no supplementary quantity of fat or oil is needed.

A heating apparatus for carrying out such a dry method has already been disclosed in WO-A-86107648 (Hoeberigs J. M. M.), WO-A-89/10085 (Hoeberigs R.), EP-A-0 504 968 (Hoeberigs J. M. M.) and U.S. Pat. No. 4,203,357 (Tournus). During the heating of e.g. french fries by way of the dry method the french fries must be continuously subjected to a movement such that the french fries are browned at all sides.

In WO-A-86/07648 hanging organs in the apparatus take care of the movement of the french fries. In WO-A-89/10085 and EP-A-0 504 968 the bottom upon which the french fries lie is provided with roughnesses and has been rotatably carried out. The rotating movement and the roughnesses take care of the movement of the french fries. In U.S. Pat. No. 4,203,357 the french fries are situated in a heating room that is subjected to a rocking movement. The rocking movement takes care of the movement of the french fries.

The apparatus according to U.S. Pat. No. 4,203,357, however, shows a number of important drawbacks.

First the french fries to be heated are always in the lower half of the heating room under the influence of the rocking movement and, consequently, far remoted from the heating source. This has as a consequence that the heating does not occur in an efficient way and, consequently, takes a longer time, which dries eventually up the french fries.

Another drawback is that the heating room has fixed dimensions and cannot be enlarged. This is a substantial limitation for the number of kinds of articles of food that can be heated by means of the apparatus.

A further drawback is that the apparatus can only be emptied by taking the recipient which forms the heating room, out of the apparatus. This must occur on condition of taking precautionary measures such as the use of a special handle or glove to prevent the hands from being burnt.

OBJECTS OF AND SUMMARY OF THE INVENTION

It is an object of the invention to avoid the drawbacks of the prior art.

It is an object of the present invention to provide for an apparatus which can be made in a simple way and automated way, and which can be easily kept in repair.

The invention provides for an apparatus for the heating of articles of food by way of the dry method. The apparatus comprises a heating room where the articles of food are brought, heating means and a ventilator for creating a hot air current, and further comprises means which may subject the heating room to a rocking movement around a horizontal axle. The heating room is nearly closed and the heating means and the ventilator are inside the heating room and are fixedly connected to the heating room.

The terms "nearly closed" refer to a heating room that is completely closed except for possible holes used for blowing off steam which may be created during the heating.

A configuration according to the invention has as an advantage that the heating means and ventilator follow the same rocking movement of the heating room since they are fixedly connected thereto such that the distance between the heating means and the articles of food remains limited and nearly equal during the whole heating period such that this heating period can be kept limited. The consequence is that the articles of food do not dry up and that they are crisp.

The heating room of the apparatus according to the invention has a bottom which is preferably carried out in pivotable way with respect to the rest of the heating room. The pivoting of the bottom facilitates the filling and emptying of the heating room with articles of food without having to take the heating room out of the apparatus.

The bottom can be preferably hooked in and out with respect to the rest of the heating room so that a cleaning may occur easily.

Furthermore, the bottom is preferably provided with a supplementary heating, a bottom heating to further limit the heating time.

In case of the heating of articles of food that consist of separate small particles such as french fries or croquettes, the bottom is preferably provided with roughnesses that prevent the articles of food from falling all at once from one side of the heating room to the other side during the rocking movement.

In another preferred embodiment of an apparatus according to the invention the heating room has a double walls, one wall of which may slide out with respect to the other wall in order to adjust the volume of the heating room without steps. This has as an advantage that articles of food of different size may be heated by means of the same apparatus in an efficient way for the volume of the heating room is always adapted and kept as small as possible.

In still another preferable embodiment of an apparatus according to the invention the apparatus comprises means which can adjust the amplitude of the rocking movement. In this way the amplitude of the rocking movement can be adapted to the kind of articles of food which must be heated. The smaller the articles of food, the greater the most suitable amplitude, and vice versa. French fries e.g. are preferably subjected to a rocking movement with a relatively large amplitude. With croquettes the amplitude may be adjusted to a lower value.

In an advantageous and flexible embodiment of an apparatus according to the invention, the bottom is subdivided into two or more segments and each segment is capable of containing one or more portions of articles of food. In this apparatus which is suitable for use in restaurants one or more portions of articles of food may be heated at the same time.

Preferably each segment is pivotable with respect of the rest of the bottom in order to allow for filling and emptying with the articles of food.

In an automated version the apparatus further comprises means for opening and closing the segments before and after each heating period.

BRIEF DESCRIPTION OF THE DRAWINGS

The invention will now be explained on the basis of drawings wherein.

DETAILED DESCRIPTION OF THE PREFERRED EMBODIMENTS

Figure 1:
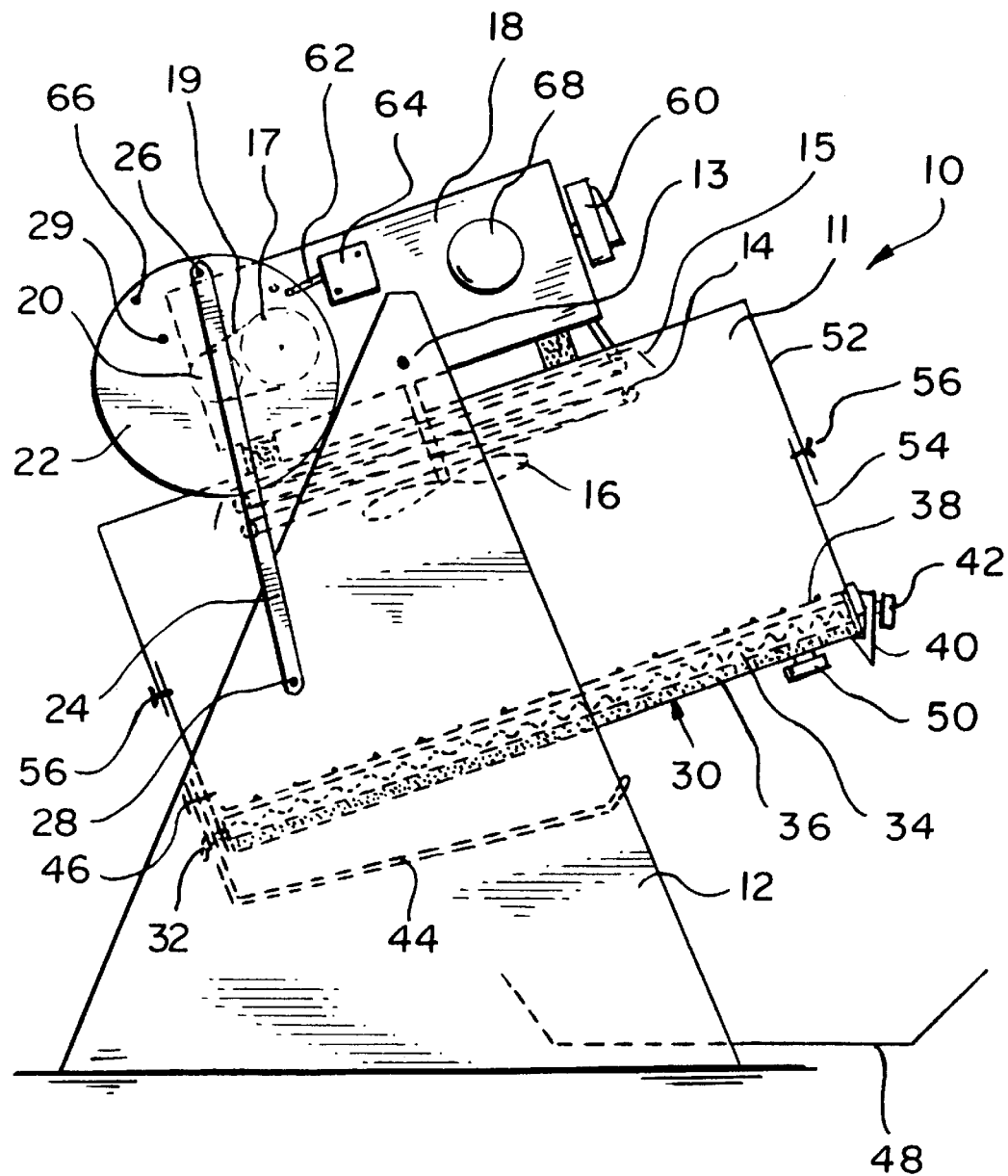
FIG. 1 is a side view of an apparatus according to the invention.
Figure 2:
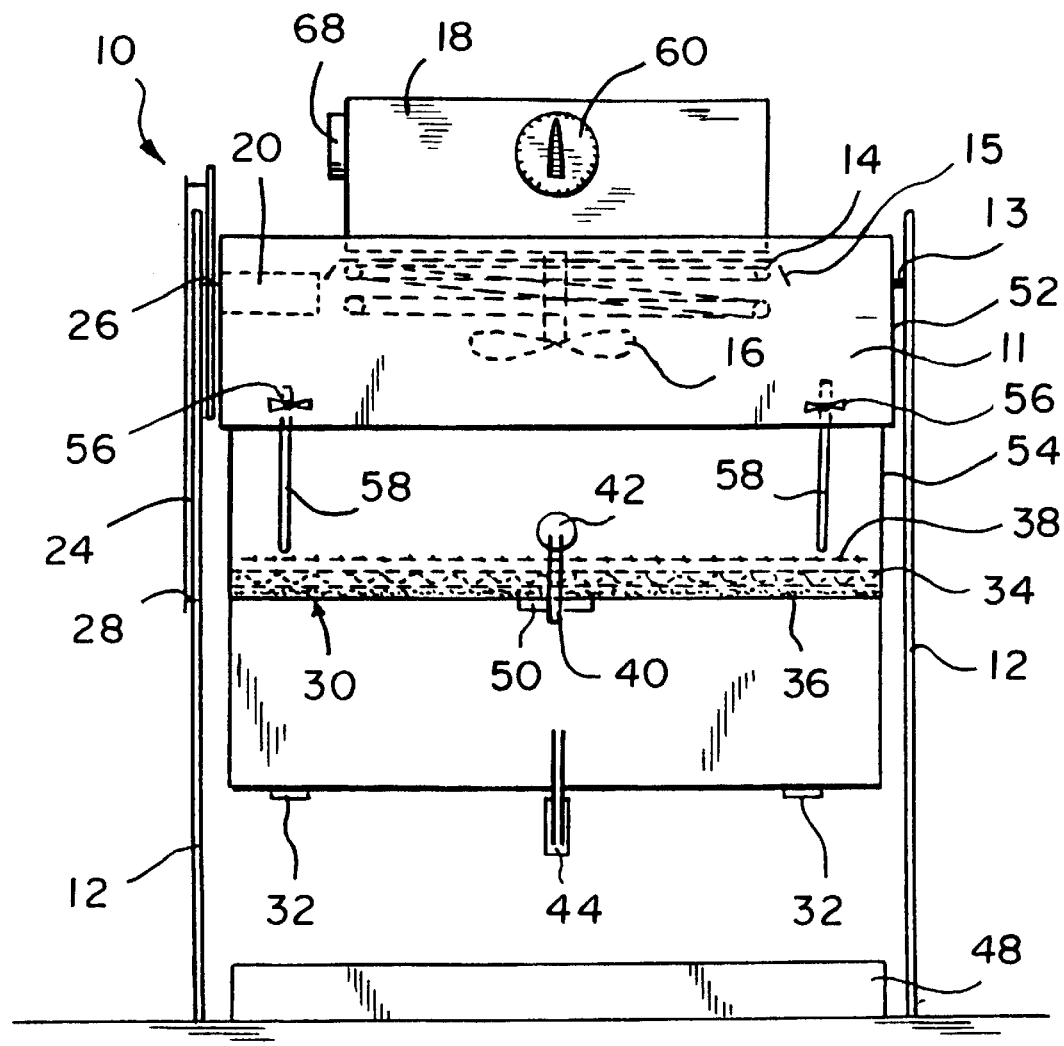
FIG. 2 is a front view of an apparatus according to the invention.

Reference is made simultaneously to FIGS. 1 and 2. An apparatus 10 for heating articles of food by way of the dry method comprises a heating room 11 which takes the form of a box with a rectangular cross-section. The heating room 11 is hung on a frame 12 by means of a horizontal axle 13.

Heating means 14, e.g. infrared radiators and/or electrical resistances, are just as a roof 15 and a ventilator 16, fixed to the ceiling of the heating room 11. The ventilator 16 sucks in air from the centre, and blows this air along the heating means sidewards to the bottom. A small electrical motor 17 is fixedly connected to a block 18 above the heating room. The electrical motor 17 drives by means of a driving belt 19 and a pulley 20 that is fixedly connected to a disc 22. A rod 24 makes a connection between the disc 22 and the frame 12 by means of two axle pins 26 and 28 and in this way takes care of a rocking movement of the heating room 11, if the electrical motor 17 is turning.

If rod 24 would be connected by means of axle pin 29 instead of axle pin 26, a rocking movement with a smaller amplitude is obtained.

In a lower portion of the heating room 11 is a bottom 30. The bottom 30 has hooks 32 in the rear which match the holes of the back wall of heating room 11. The function of the hooks is twofold. First the hooks 32 allow the bottom to pivot with respect to the rest of heating room 11 so that the heating room 11 can be filled and afterwards emptied with articles of food. Second the bottom 30 can be hooked in and out by means of the hooks 32 so that the bottom can be cleaned separately and easily.

The bottom is provided with a bottom heating 34 which, next to the heating means or heater means 14 which serve as main heating, takes care of an additional heating and takes care for a crisp underside of the pizzas in case of heating of pizzas. The bottom heating 34 forms one unity with the bottom and is e.g. a radiation source of 400 to 500 Watt which radiates to one side which is the side of the heating room. An isolating layer or plate 36 is provided under the bottom heating 34. In case the articles of food which are to be heated consist of separate small particles, the bottom 30 is provided with roughnesses which may e.g. take the form of a metal mesh 38 which is lain on the bottom.

A bolt 40 which may be operated manually by means of a knob 42, locks the bottom to the heating room during the heating. The knob 42 is carried out in a heat-isolating material. A push to the knob 42 allows the bottom 30 to pivot open. The movement of the bottom 30 is here limited by means of a support 44 in the form of a hook the height of which may be adjusted by means of a screw nut 46 that is fixed in a slot at the back side of the heating room.

After the frying of the french fries or croquettes the position of the pivoted bottom 30 is such that it is inclining downwards and to the front side, so that the french fries or croquettes slide or fall under the influence of their own weight in a tray 48.

A push to knob 50 which is fixedly connected to the bottom 30, allows to close the heating room.

The heating room 11 comprises a double wall 52 and 54 which may slide in each other. Easily operable butterfly-nuts are at the outer side of the outer wall 52. In the inner wall 54 are vertical slots inside of which the butterfly-nuts 56 may move while the two walls 52 and 54 slide over each other during the adjustment of the desired volume of the heating room 11. In this way a volume of a heating room that can be adjusted continuously is obtained over a range varying from 100% (both walls slid in each other as much as possible) until 170% (both walls slid out of each other as much possible).

It goes without saying that the vertical slots may also be made in the outer wall 52.

The apertures which are created by the slots 58 during the sliding out of the walls, may, if desired, be covered by small plates to limit the loss of heat. These small plates are then also fixed by means of the butterfly-nuts 56. The created apertures may also be used in some cases to blow off steam. If the walls are slid in each other, there are no apertures created by the slots 58 for they are covered by the inner or outer wall. In such a case steam may be blown off by providing the ceiling of the heating room 11 with coverable holes.

The apparatus according to the invention further comprises a timing clock which may be tuned by means of a knob 60. The timing clock may control the various positions of the heating room in following way: After the tuned heating period a small barring rod 62 comes in a so-called barring position by means of a mechanism 64 which reacts on the timing clock. One or more small horizontal rods 66 may be fixed to the turning disc 22. When a first small rod 66 comes at the level of the small barring rod 62, the turning movement of the disc 22 is stopped and so is the rocking movement of the heating room 11. The position of the small rod 66 which stops the movement, determines in the disc 22 the position of the heating room 11.

In this way following positions of the heating room are created:

position 1: heating room slightly inclined with the front side upwards:for filling and emptying articles of food out of one piece such as pizzas; the slight slope prevents the articles of food from sliding out of the heating room;

position 2: heating room stronger inclined with the front side upwards:for filling the heating room with french fries and croquettes;

position 3: heating room inclined with the front side downwards:for the emptying of french fries and croquettes from the heating room.

The apparatus according to the invention further comprises a knob 68 for the tuning of the desired temperature by means of a thermostat.

For the heating of french fries and croquettes the heating room 11 is rocking up and down: with a great amplitude for french fries (pin 26 connected to rod 24), with a smaller amplitude for croquettes (pin 29 connected to rod 24). Further the bottom is provided with roughnesses (mesh 38).

For the heating of pizzas and poultry the rocking movement is not necessary or there is a limited amplitude of the rocking movement, and the heating room remains nearly horizontal during the heating period. Here roughnesses are not needed on the bottom since the articles of food do not move the mesh 38 can simply be removed from the bottom 30.

An apparatus according to the invention has e.g. following dimensions minimum volume of heating room=23 cm×23 cm×8 cm maximum volume of heating room=23 corn×23 cm×13 cm power of main heating at the top=2000 Watt power of additional bottom heating=500 Watt.

With such dimensions the heating time of a portion of 500 g french fries takes not more than 145 seconds.

It goes without saying that an apparatus according to the invention consists of simple parts and that the manufacture of these parts as well as the assembly of the various parts may be easily automated.

Once in use the apparatus can be easily kept in repair and cleaned. The bottom 30 needs the greatest maintenance and can be hooked in and out for that goal. Once the bottom has been hooked out, there are nowhere spots or parts that cannot be reached.

The block 18 that is above the heating room 11, is fixedly connected to the ceiling of the heating room. Care has been taken that there is a sufficient air gap and or isolation between the block 18 where a number of parts are housed (feeding, electrical motor, timing clock . . .) and the heating room, in order to prevent the block from becoming too hot during use of the apparatus.

In an automated version the apparatus according to the invention may also be provided with a second motor which controls the movement of the bottom 30 with respect to the rest of the heating room 11. In this case the bolt 40 and the support 44 are omitted. By means of this second motor, possibly in cooperation with the first motor 17 which controls the movement of the complete heating room 11, the above-mentioned positions 1 to 3 for the filling and emptying of various kinds of articles of food can be realized in an automated way.

Figure 3:
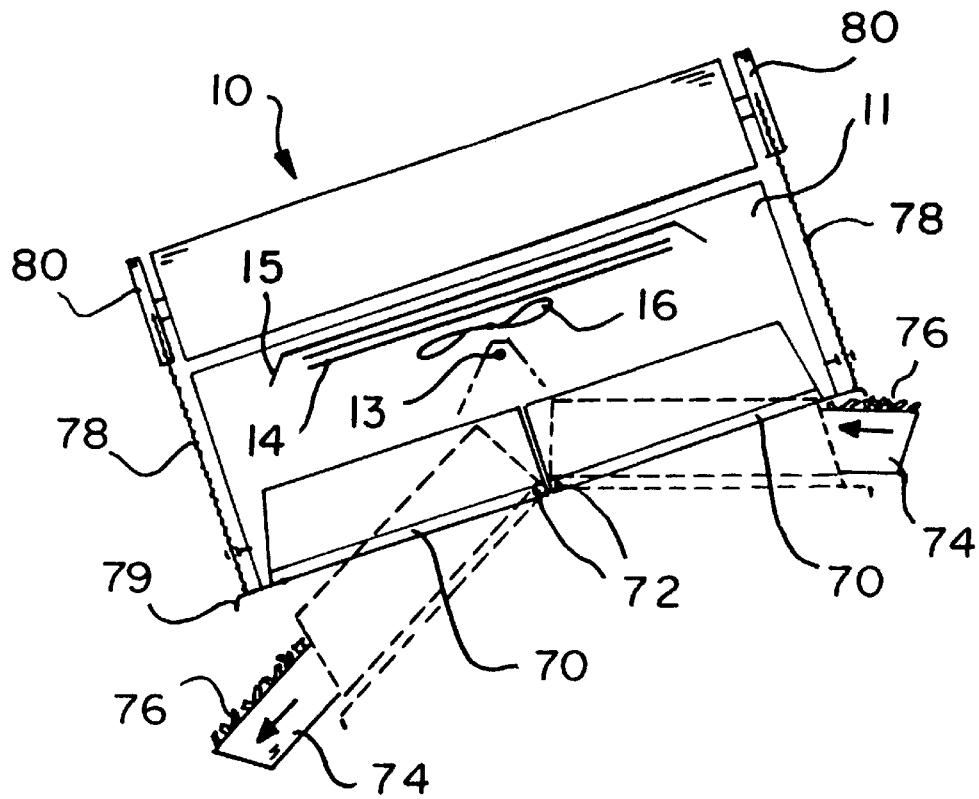
FIGS. 3 and 4 each show a schematic view of an apparatus according to the invention, where the apparatus has a bottom that is subdivided into more than one segment.
Figure 4:
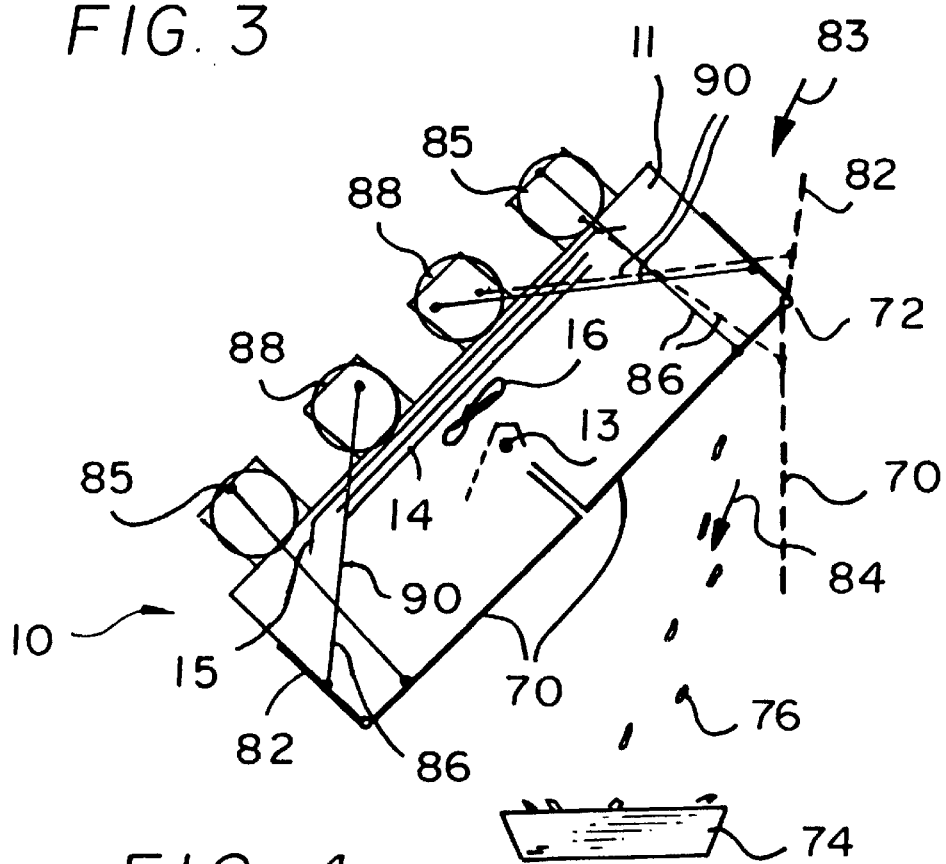

Reference is now made to FIGS. 3 and 4, where two apparatus 10 for use in a restaurant are schematically shown.

In the embodiment of FIG. 3, the bottom has been subdivided into two segments 70 and each segment may pivot around a horizontal axle 72. Each segment 70 may be provided with a separate bottom heating.

Before the heating starts, a position as shown in hatched lines at the right side of FIG. 3 is taken : the heating room 11 is in a slightly inclined position, and one of the segments 70 has pivoted out of the heating room 11 until a horizontal position so that one or two trays 74, e.g. made of aluminium, filled with the articles of food 76, may be put into the apparatus. The trays 74 may remain in the heating room 11 during the heating.

During the heating period, the segments 70 are closed.

After the end of the heating period, a position as shown in hatched lines at the left side of FIG. 3 is taken : the heating room 11 is again slightly inclined. One of the segments 70 is pivoted out of the heating room until it takes a greater slope of about 35° to 40° so that the trays 74 with the heated articles of food 76 may slide out from segment 70.

The automated control of the opening of the segments before and after the heating period may be done by means of a small cable 78 that is attached to the end 79 of segment 70 and that is ordered by means of a motor 80. The motor 80 is actuated when filling the heating apparatus and after the end of the heating period.

In the embodiment of FIG. 4, the trays 74 do not longer remain inside the heating room 11 during the heating period. Each segment 70 has also a side partition 82 that may also pivot with respect to the rest of the heating apparatus. The filling of the apparatus is done when the heating room 11 is inclined at about 45° and when side partition 82 is opened (see opened position of side partition 82 in hatched lines and arrow 83).

The heating of the articles of food 76 is done when both segments 70 and side partitions 82 are closed.

The emptying of the articles of food 76 is done again when the heating room 11 is inclined at about 45° and when segment 70 is pivoted open (see position of segment 70 in hatched lines and arrow 84).

The automated control of the opening and closing of the segments 70 may be carried out by means of electrical motors 85 and a small rod 86, one end of which is fixed excentrically to a disc of the the electrical motors 85 and the other end of which is fixed to the segments 70.

The automated control of the opening and closing of the segments side partitions 82 may be carried out by means of electrical motors 88 and a small rod 90, one end of which is fixed excentrically to a disc of the electrical motors 88 and the other end of which is fixed to the side partitions 82.

While this invention has been described as having a preferred design, it is understood that it is capable of further modifications, uses and/or adaptations of the invention following in general the principle of the invention and including such departures from the present disclosure as come within the known or customary practice in the art to which the invention pertains and as may be applied to the central features hereinbefore set forth, and fall within the scope of the invention and of the limits of the appended claims.

What is claimed is:

1. An apparatus for dry heating of food, comprising:
   a) a heating room sized for receiving food therein, the heating room being substantially closed;
   b) a heater disposed inside the heating room;
   c) said heater being substantially fixedly connected to said heating room;
   d) a ventilator disposed inside the heating room;
   e) the ventilator being operatively associated with the heater for creating a hot air current;
   f) the ventilator being substantially fixedly connected to said heating room; and
   g) a rocker operatively associated with the heating room for causing the heating room to rock about a substantially horizontal axis.

2. An apparatus according to claim 1, wherein the heating room comprises a bottom the bottom being pivotably attached to the heating room for filling the heating room and for emptying the articles of food from the heating room.

3. An apparatus according to claim 2, wherein the bottom can be hooked to and unhooked from the heating room for ease of cleaning of the heating room.

4. An apparatus according to claim 3, wherein the bottom has been provided with a bottom heater.

5. An apparatus according to claim 4, wherein the bottom has been provided with roughnesses which prevent the articles of food from falling from one side of the bottom to the other during rocking.

6. An apparatus according to claim 3 wherein the heating room has a double wall one wall of which can slide with respect to the other wall in order to be able to adjust the volume of the heating room continuously.

7. An apparatus according to claim 1 wherein the apparatus further comprises means which can adjust the amplitude of the rocking movement.

8. An apparatus according to claim 1 wherein the bottom is subdivided into two or more segments, each segment being capable of containing one or more portions of articles of food.

9. An apparatus according to claim 8 wherein each segment is pivotable with respect to at least one of the two segments in order to allow for filing and emptying of the heating room with the articles of food.

10. An apparatus according to claim 9 wherein the apparatus further comprises means for opening and closing the segments.

11. An apparatus according to claim 1, wherein the bottom has been provided with a bottom heating element.

12. An apparatus according to claim 3, wherein the bottom has been provided with roughnesses which prevent the articles of from falling from one side of the bottom to the other during rocking.

13. An apparatus according to claim 2, wherein the bottom has been provided with roughnesses which prevent the articles of food from falling all at once from one side to the other during the rocking movement.

14. An apparatus according to claim 4, wherein the heating room has a double wall, one wall of which can slide with respect to the other wall in order to be able to adjust the volume of the heating room continuously.

15. An apparatus according to claim 3, wherein the heating room has a double wall, one wall of which can slide with respect to the other wall in order to be able to adjust the volume of the heating room continuously.

16. An apparatus according to claim 2, wherein the heating room has a double wall, one wall of which can slide with respect to the other wall in order to be able to adjust the volume of the heating room continuously.

17. An apparatus according to claim 5, wherein the apparatus further comprises means for adjusting the amplitude of the rocking movement.

18. An apparatus according to claim 4, wherein the apparatus further comprises means for adjusting the amplitude of the rocking movement.

19. An apparatus according to claim 3, wherein the apparatus further comprises means For adjusting the amplitude of the rocking movement.

20. An apparatus according to claim 2, wherein the apparatus further comprises means for adjusting the amplitude of the rocking movement.

* * * * *